United States Patent
Miyata et al.

(10) Patent No.: US 7,570,620 B2
(45) Date of Patent: *Aug. 4, 2009

(54) MALFUNCTION DETECTION METHOD AND BASE STATION APPARATUS UTILIZING THE SAME

(75) Inventors: Takeo Miyata, Gifu (JP); Masashi Iwami, Gifu (JP); Tadayoshi Ito, Hashima (JP)

(73) Assignee: Kyocera Corporation, Kyoto (JP)

( * ) Notice: Subject to any disclaimer, the term of this patent is extended or adjusted under 35 U.S.C. 154(b) by 489 days.

This patent is subject to a terminal disclaimer.

(21) Appl. No.: 11/169,755

(22) Filed: Jun. 30, 2005

(65) Prior Publication Data

US 2006/0003773 A1   Jan. 5, 2006

(30) Foreign Application Priority Data

Jun. 30, 2004   (JP)   ............................. 2004-192929

(51) Int. Cl.
*H04Q 7/00*   (2006.01)
(52) U.S. Cl. ...................... 370/334; 370/328; 370/338; 370/332; 455/562.1
(58) Field of Classification Search ................. 370/324, 370/332, 345, 328, 338, 347, 334; 455/560–562.1, 455/115.1–115.3, 550.1, 68–69, 67.11, 67.13, 455/63.1, 524, 513, 509, 450, 426.1, 101, 455/103, 423
See application file for complete search history.

(56) References Cited

U.S. PATENT DOCUMENTS

| | | | | |
|---|---|---|---|---|
| 5,459,728 A | * | 10/1995 | Yoshioka et al. ............ | 370/332 |
| 5,471,649 A | * | 11/1995 | Rees et al. ................ | 455/67.14 |
| 6,009,124 A | * | 12/1999 | Smith et al. ............... | 455/562.1 |
| 6,118,981 A | * | 9/2000 | Ohmori .................... | 455/426.2 |
| 6,563,806 B1 | * | 5/2003 | Yano et al. ................. | 370/330 |
| 6,791,967 B1 | * | 9/2004 | Ishida ....................... | 370/345 |
| 7,203,508 B2 | * | 4/2007 | Ohkubo et al. .............. | 455/69 |
| 2001/0049281 A1 | * | 12/2001 | Duplessis et al. ........... | 455/422 |
| 2001/0055959 A1 | * | 12/2001 | Shen et al. ................. | 455/277.1 |
| 2002/0147007 A1 | * | 10/2002 | Hall et al. .................. | 455/423 |
| 2003/0118057 A1 | * | 6/2003 | Ushirokawa et al. ........ | 370/329 |
| 2005/0108597 A1 | * | 5/2005 | Iwami et al. ................ | 714/48 |

FOREIGN PATENT DOCUMENTS

| | | |
|---|---|---|
| JP | 6-276164 | 9/1994 |
| JP | 09-083418 | 3/1997 |
| JP | 2001-053662 | 2/2001 |
| JP | 2003-298501 | 10/2003 |

OTHER PUBLICATIONS

Japanese Office Action, with English translation, issued in Japanese Patent Application No. JP 2004-192929, mailed Jun. 26, 2007.

* cited by examiner

*Primary Examiner*—Kamran Afshar
(74) *Attorney, Agent, or Firm*—Morrison & Foerster LLP

(57) ABSTRACT

A measuring unit inputs a detection received signal and measures a received RSSI value as the detection received signal. A first comparator inputs a plurality of received RSSI values measured by the measuring unit and compares them with a predetermined threshold value. A signal difference deriving unit derives a relative relationship among the plurality of RSSI values. A second comparator compares the relative relationship with a predetermined value. If the first comparator and the second comparator detect any malfunction, a decision unit receives notification accordingly from the first comparator and the second comparator and finally judges the malfunction of communication functions associated therewith.

15 Claims, 13 Drawing Sheets

MALFUNCTION DETECTION METHOD AND BASE STATION APPARATUS UTILIZING THE SAME

BACKGROUND OF THE INVENTION

1. Field of the Invention

The present invention relates to the malfunction detection technologies, and it particularly relates to a malfunction detection method for detecting malfunctions and faults caused in apparatus and a base station apparatus utilizing the same.

2. Description of the Related Art

When a base station apparatus breaks down in a radio communication system such as a personal handyphone system, the access to a terminal apparatus via said base station apparatus is disabled. Thus, the prolonged failure of a base station apparatus is generally unacceptable for the telecommunication companies. For this reason, the base station apparatus is required to have durability and self-test capability. If the failure can be promptly detected by a self-diagnosis function, the telecommunication company can prevent the prolonged failure of a base station apparatus by replacing the faulty base station apparatus anew or the like. As a method for detecting malfunctions of apparatus, particularly for detecting faults in a plurality of antennas, the VSWR (Voltage Standard Wave Ratio) method has been executed conventionally. In the VSWR method, the reflected wave is detected from each antenna and the detected signal is converted to DC voltage so as to detect the level of the reflected wave. And if the value of the reflected wave level exceeds a predetermined level value, it is judged that a malfunction is caused in the antenna (See reference (1) in the following Related Art List, for instance).

Related Art List (1) Japanese Patent Application Laid-Open No. Hei09-83418.

In order to execute the VSWR method, the base station apparatus needs to be equipped with a circuit for executing the VSWR method in addition to the circuits for executing the communication functions. Thus, the overall size of circuits is enlarged and the power consumption increases. Also, the cost for the base station apparatus increases. In general, the VSWR method is used to detect malfunctions of a transmitter circuit and therefore cannot detect malfunction of a receiver circuit.

SUMMARY OF THE INVENTION

The present invention has been made in view of the foregoing circumstances and an objective thereof is to suppress the increase in the circuit scale and to provide a malfunction detection method for detecting, with high accuracy, malfunctions caused in apparatus and a base station apparatus utilizing the same.

A preferred mode of carrying out the present invention relates to a base station apparatus. This apparatus comprises: a control unit which allocates a predetermined channel to a terminal apparatus to be communicated and allocates another channel, which differs from said channel allocated to the terminal apparatus, to a control signal; a communication unit which communicates with a terminal apparatus to which a predetermined channel is allocated to and which transmits periodically a control signal to which a channel other than said channel is allocated; a measuring unit which receives periodically, via the communication unit, a control signal from another base station apparatus through the channel allocated to the terminal apparatus and the another channel, which differs from said channel allocated to the control signal, and which measures the quality of the thus received control signal; and a detection unit which detects a malfunction, if any, of the communication unit based on the quality of the control signal measured by the measuring unit.

The "channel" is a radio channel through which the communication is performed between radio apparatuses such as a base station apparatus and a terminal apparatus. More specifically, it indicates a particular frequency band in the case of FDMA (Frequency Division Multiple Access), a particular time-slot or slot in the case of TDMA (Time Division Multiple Access), a particular code sequence in the case of CDMA (Code Division Multiple Access) and a particular space or pass in the case of SDMA (Space Division Multiple Access). Here, the channel means any one of these.

By employing the above apparatus, malfunctions caused in a communication unit are detected using control signals received from other base station apparatus, so that the necessary processing can be done by utilizing a function used for the communication operation and thereby the increase in the scale of an apparatus can be suppressed. Furthermore, the control signals are received periodically, so that the detection processing can be executed at high speed. Since a channel allocated for a control signal is different from that allocated to the terminal apparatus, the interference effect can be made small.

The measuring unit may measure the strength of a received control signal as the quality of the thus received control signal, and if the strength of a measured control signal is less than or equal to a predetermined threshold value, the detection unit may determine that a malfunction of the communication unit has been detected. The communication unit includes a plurality of antennas, and the measuring unit may measure, as the quality of the thus received control signal, the strengths of control signals received respectively by the plurality of antennas, and the detection unit may detect a malfunction of the communication unit, based on a relative relationship among the strengths of control signals received respectively by the plurality of antennas.

The "relative relationship" means a relationship based on a reference where at least one of the strengths of control signals received respectively by the plurality of antennas is set as the reference.

The detection unit calculates a difference in strength between control signals received respectively by two of the plurality of antennas, and if the calculated difference is greater than a predetermined threshold, it may be determined that part of the communication unit containing an antenna corresponding to the smaller strength in the control signals received respectively by two of the plurality of antennas suffers a malfunction. The detection unit calculates a difference in strength between control signals received respectively by two of the plurality of antennas, and if the calculated difference is greater than a predetermined threshold, it may be determined that part of the communication unit containing an antenna corresponding to the larger strength in the control signals received respectively by two of the plurality of antennas is normal.

"Two" means any two of the strengths in the control signals received respectively the plurality of antennas and may also be two strengths selected based on a predetermined rule, for instance, the maximum value and the minimum value.

"Part of the communication unit" denotes a part related directly or indirectly to an antenna among functions included in a communication unit.

The detection selects maximum strength and minimum strength from among the strengths of control signals received respectively by the plurality of antennas, and if the strengths of control signals received respectively by the plurality of antennas lie within a first range from the selected maximum strength and lie outside a second range from the selected minimum strength, it may be determined that part of the communication unit containing an antenna corresponding to said strength of control signals is normal. When the communication unit receives a channel allocation request from a new terminal apparatus while a detection processing is being executed, the detection unit may stop the detection processing.

The "first range" and the "second range" are each a predetermined region or interval and the size thereof may be arbitrary.

The "channel allocation request" is a signal transmitted when a terminal apparatus requests a base station apparatus to allocate a channel. For example, this channel allocation request is transmitted when the base station apparatus receives a request of new connection from the terminal apparatus or when a terminal apparatus in the sleep state is reset.

Another preferred mode of carrying out the present invention relates to a malfunction detecting method. This method is characterized in that a control signal is received periodically from another base station apparatus by a predetermined channel allocated to a terminal apparatus to be communicated and another channel, which differs from said channel allocated to the terminal apparatus, the another channel differing from a channel allocated to the control signal, the quality of the received control signal is measured, and a malfunction of functions to communicate with the terminal apparatus is detected based on the measured quality of control signal.

Still another preferred mode of carrying out the present invention relates also to a malfunction detecting method. This method comprises: allocating a predetermined channel to a terminal apparatus to be communicated and allocating another channel, which differs from said channel allocated to the terminal apparatus, to a control signal; communicating with a terminal apparatus to which a predetermined channel is allocated to and, at the same time, transmitting periodically a control signal to which another channel, other than said channel allocated to the terminal apparatus, is allocated; receiving periodically, via said transmitting, a control signal from another base station apparatus through a channel other than the channels allocated to the terminal apparatus and the control signal, and measuring the quality of the thus received control signal; and detecting a malfunction, if any, of functions to communicate with the terminal apparatus based on the quality of the measured control signal.

The measuring may be such that the strength of a received control signal is measured as the quality of a received control signal, and the detecting may be such that if the strength of a measured control signal is less than or equal to a predetermined threshold value, a malfunction of functions to communicate with the terminal apparatus is said to be detected. The measuring may be such that the strengths of control signals received respectively by a plurality of antennas are measured as the quality of received control signals, and the detecting may be such that a malfunction of functions to communicate with the terminal apparatus is detected based on a relative relationship among the strengths of control signals received respectively by the plurality of antennas. The measuring may be such that the strengths of control signals received respectively by the plurality of antennas is measured as the quality of a received control signal, and the detecting may be such that if the strengths of control signals received respectively by the plurality of antennas are greater than a predetermined threshold value, a malfunction of functions to communicate with the terminal apparatus is detected based on a relative relationship among the strengths of control signals received respectively by the plurality of antennas. The detecting may be such that a difference in strength between control signals received respectively by two of the plurality of antennas is calculated, and if the calculated difference is greater than a predetermined threshold, part of a communication unit containing an antenna corresponding to the smaller strength in the control signals received respectively by two of the plurality of antennas suffers a malfunction.

The detecting may be such that a difference in strength between control signals received respectively by two of the plurality of antennas is calculated, and if the calculated difference is greater than a predetermined threshold, part of a communication unit containing an antenna corresponding to the larger strength in the control signals received respectively by two of the plurality of antennas is normal. The detecting may be such that maximum strength and minimum strength are selected from among the strengths of control signals received respectively by the plurality of antennas, and if the strengths of control signals received respectively by the plurality of antennas lie within a first range from the selected maximum strength and lie outside a second range from the selected minimum strength, part of functions to communicate with a terminal unit containing an antenna corresponding to said strength of control signals is normal. When the transmitting receives a channel allocation request from a new terminal apparatus while a detection processing is being executed, the detecting may stop the detection processing.

Still another preferred mode of carrying out the present invention relates to a program. This program includes the functions of: allocating a predetermined channel to a terminal apparatus to be communicated, allocating another channel, which differs from said channel allocated to the terminal apparatus, to a control signal and storing information on the allocated channels in a memory unit; communicating, via a wireless network, with a terminal apparatus to which a predetermined channel is allocated to and, at the same time, transmitting periodically a control signal to which another channel other than said channel is allocated; receiving periodically, via a wireless network, a control signal from another base station apparatus through a channel other than the channels allocated to the terminal apparatus and the control signal, measuring the quality of the thus received control signal and storing information on the measured quality of the control signal in a memory unit; and detecting a malfunction, if any, of functions to communicate with the terminal apparatus based on the quality of the control signal stored.

The measuring and storing in a memory unit may be such that the strength of a received control signal is measured as the quality of a received control signal, and the detecting may be such that if the strength of a measured control signal is less than or equal to a predetermined threshold value, a malfunction of functions to communicate with the terminal apparatus is said to be detected. The measuring and storing in a memory unit may be such that the strengths of control signals received respectively by a plurality of antennas are measured as the quality of received control signals, and the detecting may be such that a malfunction of functions to communicate with the terminal apparatus is detected based on a relative relationship among the strengths of control signals received respectively by the plurality of antennas. The measuring and storing in a memory unit may be such that the strengths of control signals received respectively by the plurality of antennas is measured as the quality of a received control signal, and the detecting may be such that if the strengths of control signals received respectively by the plurality of antennas are greater than a predetermined threshold value, a malfunction of functions to communicate with the terminal apparatus is detected based on a relative relationship among the strengths of control signals received respectively by the plurality of antennas. The detecting may be such that a difference in strength between control signals received respectively by two of the plurality of antennas is calculated, and if the calculated difference is greater than a predetermined threshold, part of a communication unit containing an antenna corresponding to the smaller strength in the control signals received respectively by two of the plurality of antennas suffers a malfunction.

The detecting may be such that a difference in strength between control signals received respectively by two of the plurality of antennas is calculated, and if the calculated difference is greater than a predetermined threshold, part of a communication unit containing an antenna corresponding to the larger strength in the control signals received respectively by two of the plurality of antennas is normal. The detecting may be such that maximum strength and minimum strength are selected from among the strengths of control signals received respectively by the plurality of antennas, and if the strengths of control signals received respectively by the plurality of antennas lie within a first range from the selected maximum strength and lie outside a second range from the selected minimum strength, part of functions to communicate with a terminal unit containing an antenna corresponding to said strength of control signals is normal. When the transmitting receives a channel allocation request from a new terminal apparatus while a detection processing is being executed, the detecting may stop the detection processing.

It is to be noted that any arbitrary combination of the above-described structural components as well as the expressions according to the present invention changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

Figure 1:
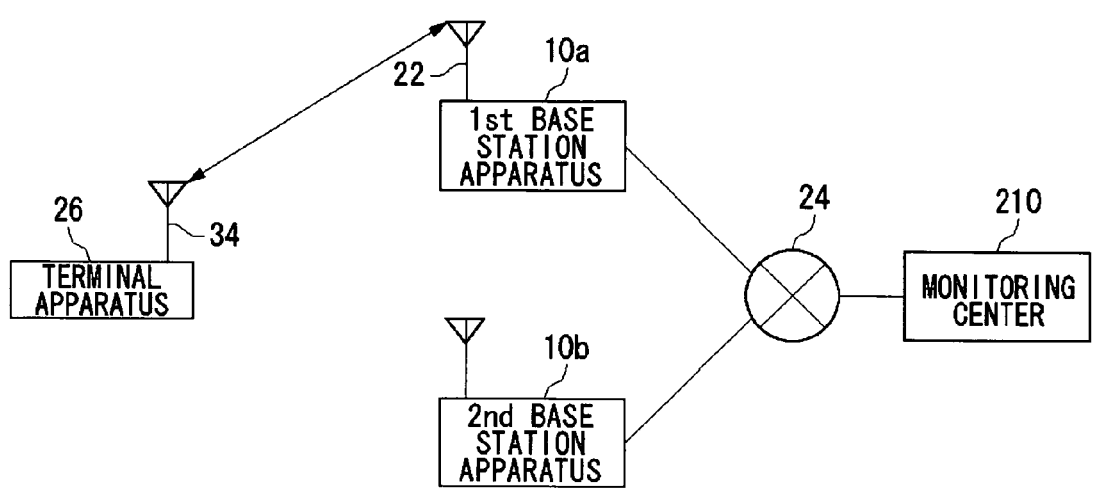
FIG. 1 illustrates a structure of a communication system according to a first embodiment of the present invention.

The invention will now be described based on the following embodiments which do not intend to limit the scope of the present invention but exemplify the invention. All of the features and the combinations thereof described in the embodiments are not necessarily essential to the invention.

FIRST EMBODIMENT

Before describing the present invention in a specific manner, an outline of the present invention will be described first. A first embodiment according to the present invention relates to a base station apparatus in a personal handyphone system (PHS). In the personal handyphone system, a plurality of time slots are provided within a single frame and the communication between a base station apparatus and a terminal apparatus is executed using the time slots. Using said time slots the base station apparatus transmits control information to the terminal apparatus. At the time of transmitting a control signal, used is the frequency different from that used in communicating with the terminal apparatus. Such base station apparatus are installed by a telecommunication company at intervals of a predetermined distance. And in general a base station apparatus can receive control signals transmitted from the other base station apparatus.

A base station apparatus according to the present embodiment receives control signals transmitted from the other base station apparatus, and detects malfunction of apparatus based on the control signals received. The base station apparatus measures the strength of the received control signal, and if the thus measured strength thereof is smaller than a predetermined threshold value, then it determines that a malfunction of apparatus has been detected. The base station apparatus according to the present embodiment is equipped with a plurality of antennas and, in order to improve the accuracy of detecting malfunctions, the base station apparatus compares relatively the strengths of the control signals received respectively by the plurality of antennas, so as to detect malfunction of apparatus. That is, two values among the strengths of a plurality of control signals are selected and if the difference between the selected two values is greater than a predetermined threshold value, it is determined that the antenna corresponding to the smaller value has a defect. By carrying out the aforementioned subsequent relative detection processing in a malfunction detection processing, the effect of the distances among the base station apparatus on a detection result can be made small.

Since the base station apparatus are generally installed at high altitudes, the control signals transmitted from the other base station apparatus are less subject to the fading or the like. Furthermore, since used actually in the transmission of control signals is the frequency other than that used in the communication, the transmission of control signals is less subject to the effect of interference. Furthermore, since the control signals are transmitted periodically, the base station apparatus can acquire, in a short period, data necessary for malfunction detection processing.

FIG. 1 illustrates a structure of a communication system 100 according to a first embodiment of the present invention. The communication system 100 includes a first base station apparatus 10a and a second base station apparatus 10b, which are generically referred to as base station apparatus 10, a terminal apparatus 26, a network 24 and a monitoring center 210. The base station apparatus 10 includes antennas 22 and the terminal apparatus includes an antenna 34.

The base station apparatus 10 is connected to the network 24 at the wired side and is connected to the terminal apparatus 26 at the wireless side. With this structure, the base station apparatus 10 relays signals communicated between the network 24 and the terminal apparatus 26. A plurality of terminal apparatus 26 are connected through TDMA/TDD scheme, and the control signal is conveyed to the plurality of terminal apparatus 26 through a single time slot. As shown in FIG. 1, a plurality of base station apparatus 10 are provided at a predetermined distance from one another. Thus, for example, the first base station apparatus 10a can receive the control signal from the second base station apparatus 10b which differs from the first base station apparatus 10a. Though the detail will be described later, the base station apparatus 10 receives the control signals transmitted from the other base station apparatus 10 and detects a malfunction of the base station apparatus 10 based on the received signals. If the base station apparatus 10 detects the malfunction of apparatus, then it will notify the monitoring center 210 accordingly via the network 24.

The network 24 transmits information such as data and audio. The network 24 is connected to not only the base station apparatus 10 but also a switchboard (not shown) and the like. The monitoring center 210 is connected to the network 24. And if the base station apparatus 10 detects a malfunction, the monitoring center 210 receives a notification accordingly and the telecommunication company carries out a predetermined processing. The predetermined processing is preferably a processing, in which an administrator can take predetermined measures to said base station apparatus 10, such as giving an administrator of the communication system 100 a warning by displaying the contents of the notification.

The terminal apparatus 26 is a communication device used by a user and is connected to the base station apparatus 10. Though the terminal apparatus 26 shown in FIG. 1 is connected to the first base station apparatus 10a, it may be sometimes connected to the second base station apparatus 10b by hand-over. A single unit of terminal apparatus 26 is shown in FIG. 1. But the case is not limited thereto and a plurality of terminal apparatus may be connected to the base station apparatus 10. To execute wireless communication between the base station apparatus 10 and the terminal apparatus 26, the base station apparatus 10 and the terminal apparatus 26 are equipped with antennas 22 and an antenna 34, respectively.

Figure 2:
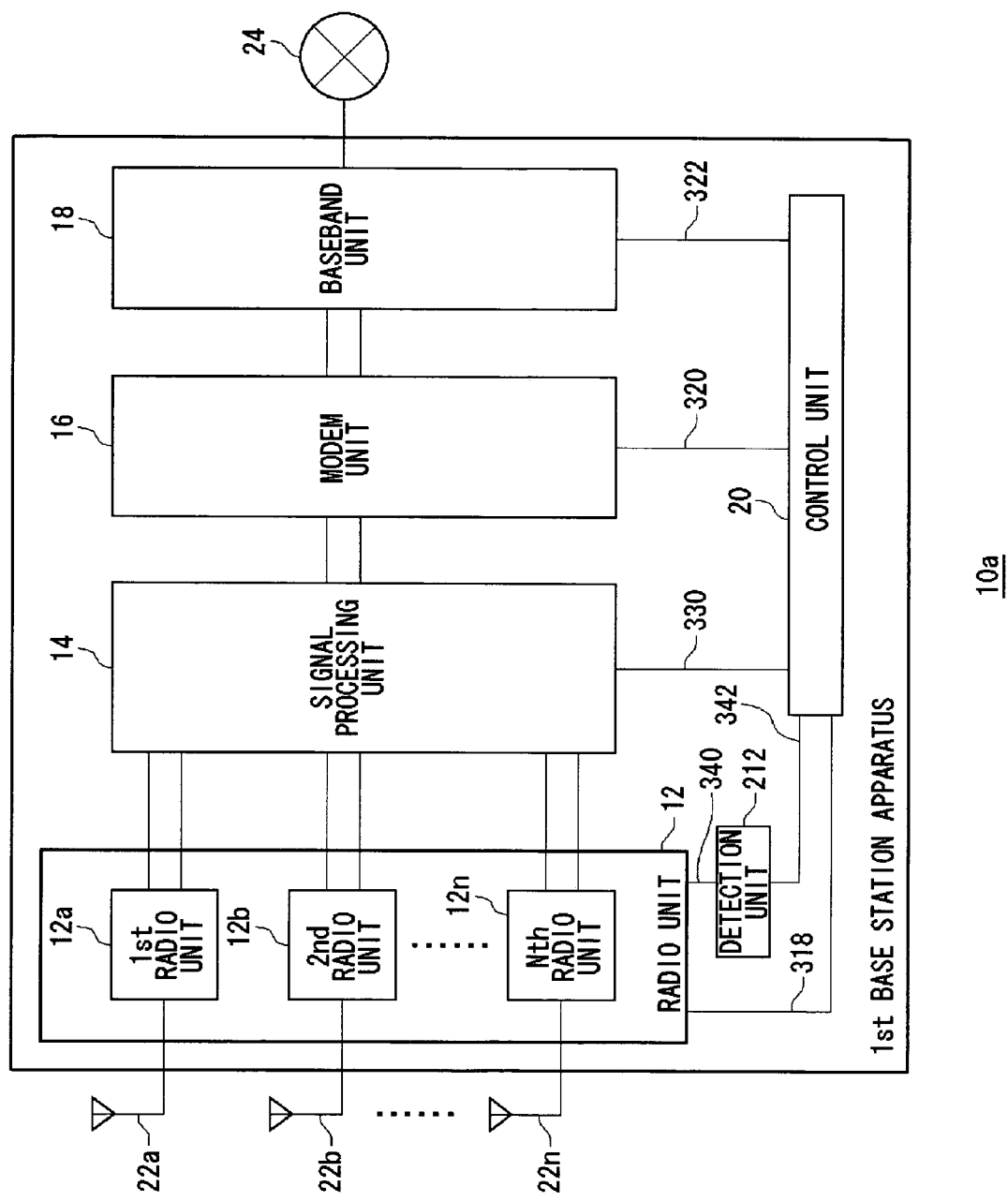
FIG. 2 illustrates a structure of a first base station apparatus shown in FIG. 1.

FIG. 2 illustrates a structure of the first base station apparatus 10a. The first base station apparatus 10a includes a first antenna 22a, a second antenna 22b . . . and an Nth antenna 22a, which are generically referred to as antennas 22, a radio unit 12, a signal processing unit 14, a modem unit 16, a baseband unit 18, a control unit 20 and a detection unit 212. The radio unit 12 includes a first radio unit 12a, a second radio unit 12b, . . . and an Nth radio unit 12n. Signals involved here include a radio unit control signal 318, a modem unit control signal 320, baseband unit control signal 322, a signal processor control signal 330, a detection received signal 340 and a detection result signal 342.

The baseband unit 18 is an interface with the network 24 and performs transmission/receiving processing of information signals to be transmitted from and received by the communication system 100. The baseband unit 18 may also carry out error correction or automatic retransmission processing, but the description of such processings is omitted here.

As a modulation processing, the modem unit 16 modulates information signals to be transmitted, using a modulation scheme of π/4 shift QPSK (Quadrature Phase Shift Keying). As a demodulation processing, the modem unit 16 demodulates received signals and reproduces the transmitted information signals. Instructions necessary for carrying out the modulation processing and the demodulation processing are issued from the control unit 20 with the modem unit control signal 320.

The signal processing unit 14 performs a signal processing necessary for a transmission/receiving processing of adaptive array antennas. An adaptive array antenna processing will be discussed later. The signal processing unit 14 communicates with at least one terminal apparatus 26 based on the channel allocation by the control unit 20, and at the same time transmits periodically a control signal to which a channel other than that allocated to said terminal apparatus 26 is allocated. Here, the contents of information contained in the control signal may be arbitrary, and generally contains the contents to be conveyed to the terminal apparatus 26 at the time of executing communication with the terminal apparatus 26, for example, the identification number of the base station apparatus 10.

The radio unit 12 carries out frequency conversion processing between baseband signals and radio frequency signals, which are processed by the signal processing unit 14, the modem unit 16 and the baseband unit. The radio unit 12 carries out amplification processing, A-D or D-A conversion processing and the like.

The antennas 22 perform transmission/receiving processings on radiofrequency signals. The directivity of the respective antennas may be arbitrary and the number of basestation antennas 22 is plural and it is denoted here by N.

The control unit 20 controls the channel allocation as well as the timings of the radio unit 12, the signal processing unit 14, the modem unit 16 and the baseband unit 18. The control unit 20 allocates channels as follows. Here, one channel corresponds to one time slot. A plurality of time slots constitute one frame, and a plurality of frames are arranged continuously. Here, one frame is composed of eight time slots. Among the eight time slots, four of them are used for reverse link (uplink) whereas the remaining four time slots are used for forward link (downlink). When the base station apparatus communicates with a terminal apparatus 26, the control unit 20 in the base station apparatus normally allocates to the terminal apparatus 26 one each of the time slots for uplink and those for downlink. Furthermore, a time slot other than that allocated to the terminal apparatus 26 is assigned to the control signal.

The detection unit 212 detects the malfunction of the base station apparatus 10 itself, based on a control signal received from other base station apparatus 10. That is, the detection unit 212 receives periodically the control signal received from the other base station apparatus 10, by a time slot allotted to the terminal apparatus 26 and a time slot, other than that allocated to the control signal to be transmitted, allotted in the control unit 20. In so doing, said control signal was received via a plurality of antennas 22. Though the thus received control signal may have a radio frequency, it may be converted to an intermediate frequency or a baseband frequency by the radio unit 12 and may also be converted to a digital signal and it will be indicated here by a detection received signal 340. The detection unit 212 measures, as the quality of a received control signal, the strength of the received control signal.

Based on the thus measured quality of the control signal, the radio unit 12 detects any malfunction of communication functions in the radio unit 12 and so forth. More specifically, the detection unit 212 compares the measured strength of the control signal with a predetermined threshold value. And if said strength is larger than the threshold value, the detection unit 212 detects the malfunction of a communication function based on a relative relationship among the strengths of a plurality of control signals. That is, the detection unit 212 calculates a difference in strength between two control signals among the plurality of control signals. And if the calculated difference is larger than a predetermined threshold value, it is regarded that the malfunction of part of communication function containing an antenna 22, which corresponds to the smaller strength in the two control signals, has been detected. For instance, if the strength of the control signal received by the first antenna 22a corresponds to the aforementioned smaller strength, it is determined that the malfunction has been detected in the first antenna 22a and part of the radio unit 12 connected to the first antenna 22.

The detection of a malfunction of communication functions based on the relative relationship among the plurality of control signals may also be carried out as follows. The detection unit 212 calculates a difference in strength between two control signals among the plurality of control signals. And if the calculated difference is larger than a predetermined threshold value, it is regarded that the normality of part of communication function containing an antenna 22, which corresponds to the larger strength in the two control signals, has been detected. If the detection unit 212 detects any malfunction as a result of this processing, it is outputted as a detection result signal 342. And if the base station apparatus 10 receives a new channel allocation request from a terminal apparatus 26 while it is executing the aforementioned detection processing, said detection processing is stopped. That is, the processing for the terminal apparatus 26 issuing the new request is given priority.

Figure 3:
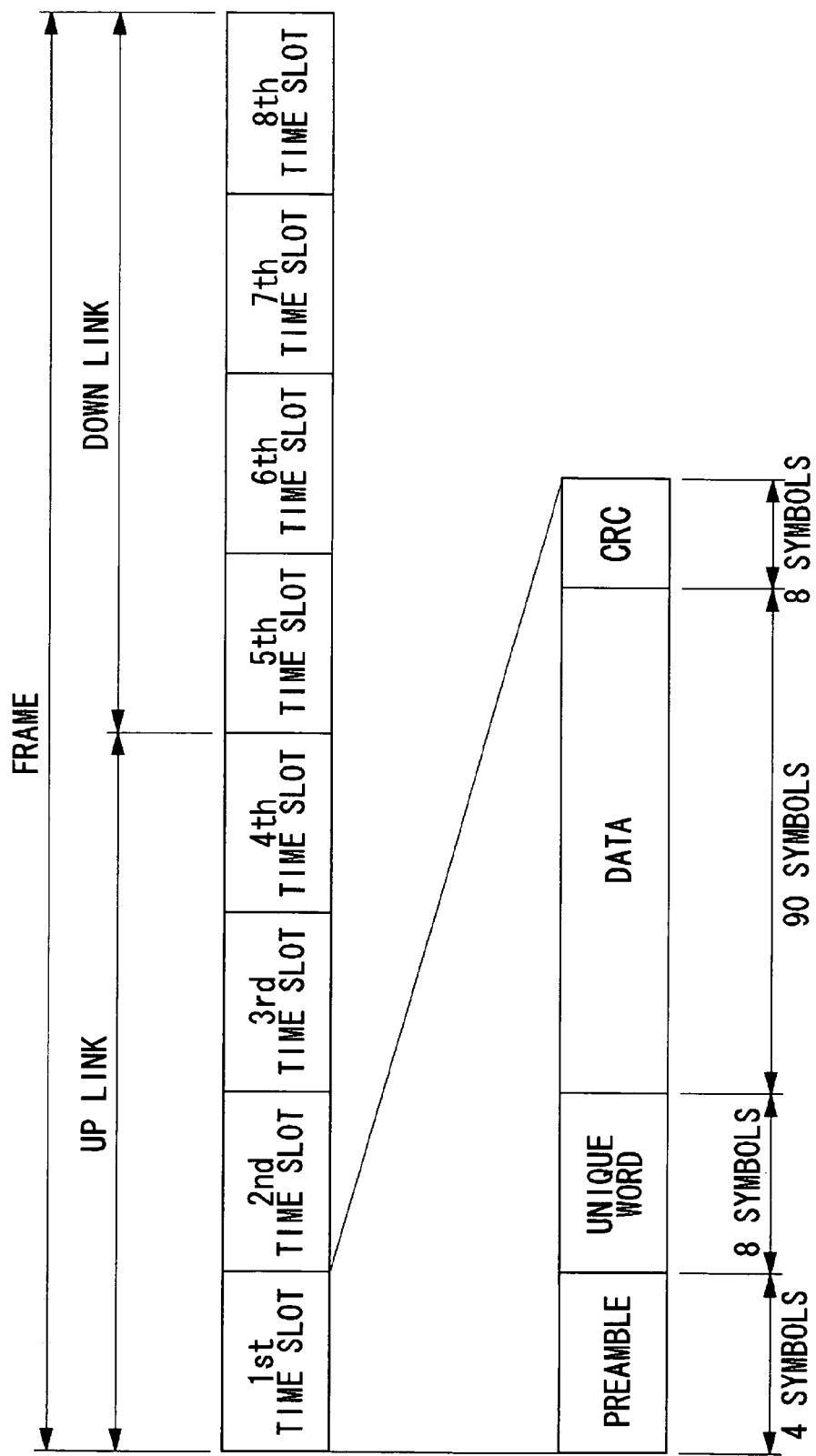
FIG. 3 illustrates a frame format according to the first embodiment.

FIG. 3 illustrates a frame format. This is the frame format for the personal handyphone system. As described earlier, one frame contains four time slots for uplink composed of the "first time slot" to the "fourth time slot" and four time slots for downlink composed of the "fifth time slot" and the "eighth time slot". The respective time slots are allocated to the terminal apparatus 26 and the control signal. In FIG. 3, one frame is represented by the contiguously arranged time slots. Though in practice the time slots are arranged continuously in time, the time slots allotted to the control signal is assigned a frequency which differs from the time slot allotted to the terminal apparatus 26.

FIG. 3 further illustrates a data structure of one time slot. A preamble is placed in the four leading symbols of the time slot, which is used for timing synchronization. A unique word is placed in the subsequent eight symbols. The preamble and the unique word, which are both known to the base station apparatus 10 and the terminal apparatus 26, can also be used as a training signal, which will be discussed later. The present embodiment will be described with reference to the frame format shown in FIG. 3 of a personal handyphone system but the present invention is not limited thereto.

Figure 4:
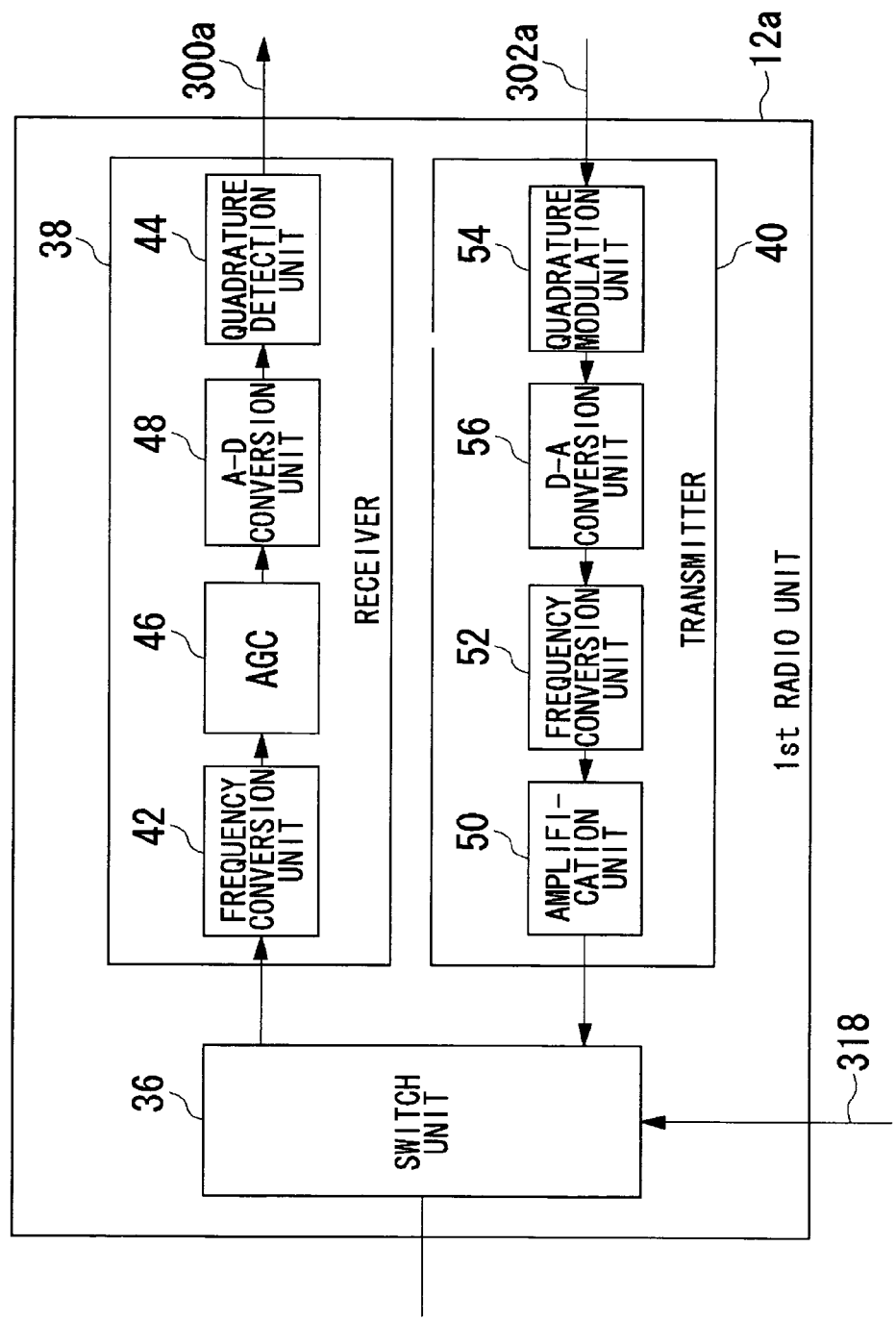
FIG. 4 illustrates a structure of a first radio unit shown in FIG. 2.

FIG. 4 illustrates a structure of the first radio unit 12a. The first radio unit 12a includes a switch unit 36, a receiver 38 and a transmitter 40. The receiver 38 includes a frequency conversion unit 42, a quadrature detection unit 44, an AGC (Automatic Gain Control) unit 46 and an A-D conversion unit 48. The transmitter 40 includes an amplification unit 50, a frequency conversion unit 52, a quadrature modulation unit 54 and a D-A conversion unit 56. Signals involved here include a first digital received signal 300a, which is generically referred to as a digital received signal 300, and a first digital transmission signal 302a, which is generically referred to as a digital transmission signal 302.

The switch unit 36 switches input and output of signals to the receiver 38 and the transmitter 40 based on an instruction of the radio unit control signal 318.

The frequency conversion unit 42 in the receiver 38 and the frequency conversion unit 52 in the transmitter 40 perform frequency conversion between a radio-frequency signal and one or more intermediate-frequency signals.

The quadrature detection unit 44 generates baseband analog signals from intermediate-frequency signals through quadrature detection. The baseband signal, which generally contains in-phase components and quadrature components, shall be represented by two signal lines. For the sake of clarity in the figure, the baseband signal is presented here by a single signal line, and the same will be applied hereinafter. On the other hand, the quadrature modulation unit 54 generates intermediate-frequency signals from baseband analog signals through quadrature modulation.

The AGC unit 46 automatically controls gain so that the amplitude of baseband analog signals is within the dynamic range of the A-D conversion unit 48.

The A-D conversion unit 48 converts baseband analog signals into digital signals, and the D-A conversion unit 56 converts baseband digital signals into analog signals. Hereinbelow, the digital signals outputted from the A-D conversion unit 48 are called digital received signals 300, and the digital signals inputted to the D-A conversion unit 56 are called digital transmission signals 302.

The amplification unit 50 amplifies radio-frequency signals to be transmitted.

Figure 5:
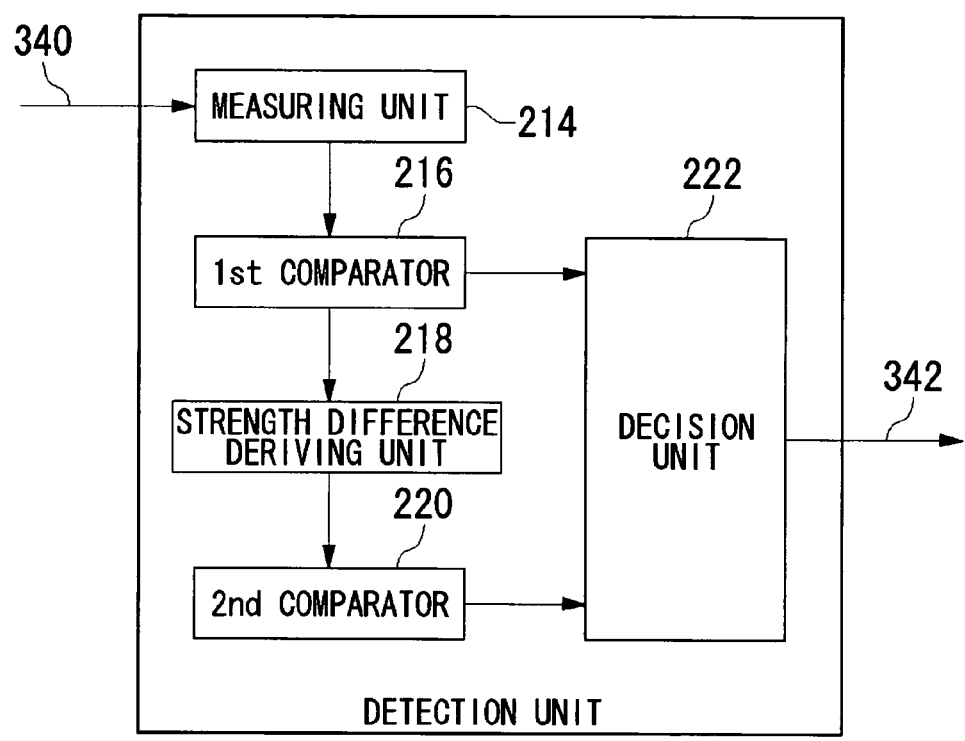
FIG. 5 illustrates a structure of a detection unit shown in FIG. 2.

FIG. 5 illustrates a structure of the detection unit 212. The detection unit 212 includes a measuring unit 214, a first comparator 216, a strength difference deriving unit 218, a second comparator 220 and a decision unit 222.

The measuring unit 214 receives the input of a detection received signal 340 and measures the quality of the detection received signal 340. Here, the detection received signal 340 corresponds to control signals received by a plurality of antennas 22, and it contains components corresponding to the number of antennas 22. As described earlier, the frequency band of the detection received signal 340 may be arbitrary, and it corresponds to an output signal from the frequency conversion unit 42 or the quadrature detection unit 44 shown in FIG. 4. Here, the measuring unit 214 measures a received RSSI (Received Signal Strength Indicator) value as the quality for the plurality of control signals.

The first comparator 216 inputs a plurality of received RSSI values measured by the measuring unit 214 and compares them with a predetermined threshold value. If there is any received RSSI value which is smaller than the threshold value, the first comparator 216 notifies the antennas 22 accordingly. Information as to the received RSSI values which are larger than the threshold value is outputted to the strength difference deriving unit 218.

From the received RSSI values inputted from the first comparator 216 among the plurality of received RSSI values measured by the measuring unit 214, the strength difference deriving unit 218 selects the maximum value and the minimum value in the received RSSI values which have not been determined as to whether they are normal or not. Then, the strength difference deriving unit 218 calculates a difference between the maximum value and the minimum value. The second comparator 220 compares the difference calculated by the strength difference deriving unit 218 with a predetermined threshold value. If the calculated difference is smaller than the threshold value, it is determined that the communication function containing an antenna 22, which received the control signal corresponding to the minimum value, is normal. On the other hand, if the calculated difference is greater than or equal to the threshold value, it is determined that the communication function containing an antenna 22, which received the control signal corresponding to the minimum value, is faulty. When the fault is detected, the second comparator 220 notifies the decision unit 222 accordingly. For the received RSSI values which still have not been determined as to whether they are normal or not, the strength difference deriving unit 218 and the second comparator 220 repeats the above processing.

If the first comparator 216 and the second comparator 220 detect a malfunction, the decision unit 222 receives notification from the first comparator 216 and the second comparator 220 to that effect and finally determines the malfunction of communication function corresponding thereto. For example, the decision unit 222 determines the malfunction of the first antenna 22a and a part of the radio unit 12 connected to the first antenna 22a. The result thereof is outputted as a detection result signal 342.

Figure 6:
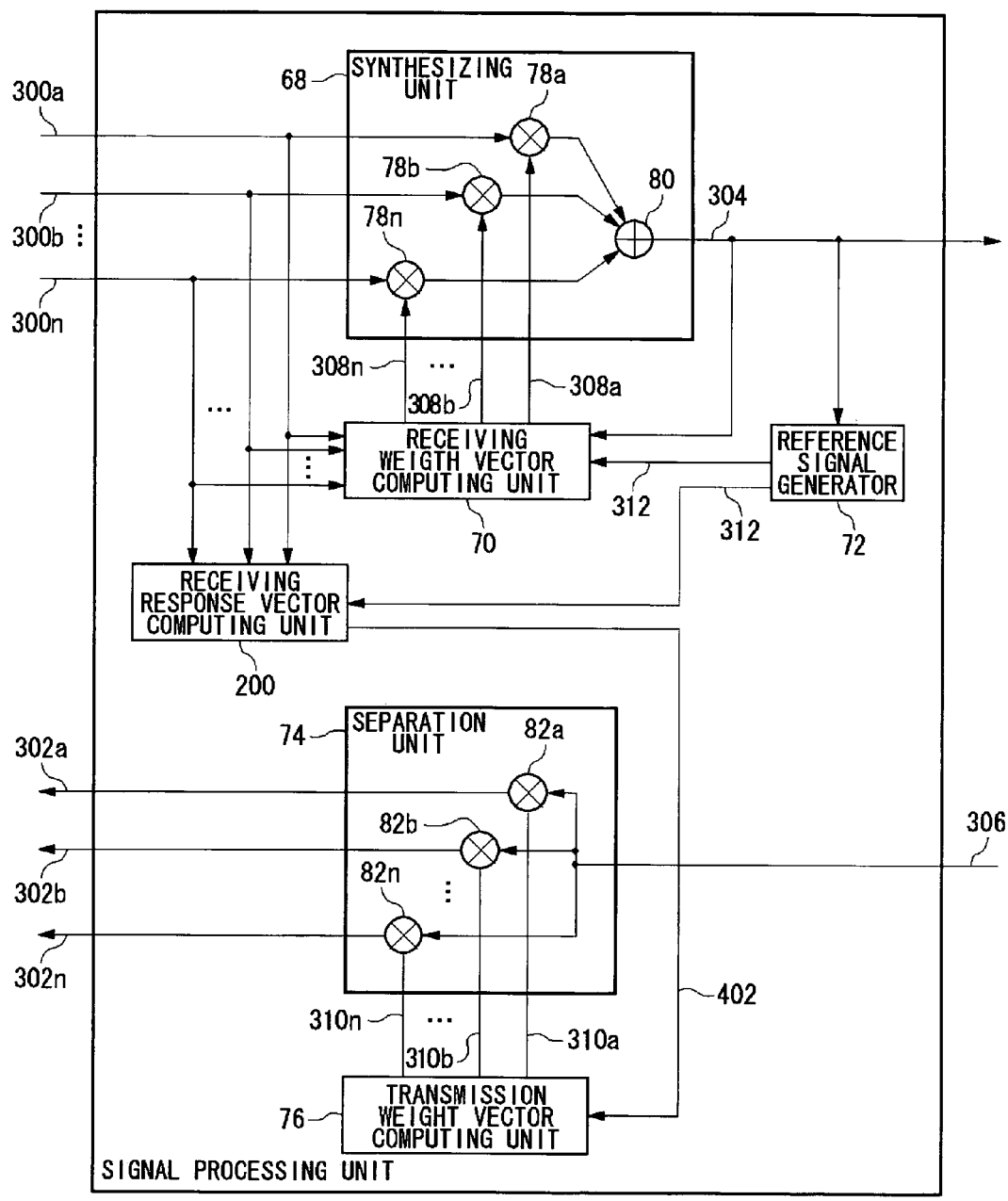
FIG. 6 illustrates a structure of a signal processing unit shown in FIG. 2.

FIG. 6 illustrates a structure of the signal processing unit 14. The signal processing unit 14 includes a reference signal generator 72, a receiving weight vector computing unit 70, a synthesizing unit 68, a receiving response vector computing unit 200, a transmission weight vector computing unit 76 and a separation unit 74. The synthesizing unit 68 includes a first multiplier 78a, a second multiplier 78b, . . . and an Nth multiplier 78n, which are generically referred to as multipliers 78 and an adder 80. The separation unit 74 includes a first multiplier 82a, a second multiplier 82b, . . . and an Nth multiplier 82n, which are generically referred to as multipliers 82.

Signals involved in the signal processing unit 14 include a composite signal 304, a pre-separation signal 306, a first receiving weight vector 308a, a second receiving weight vector 308b, . . . and an Nth receiving weight vector 308n, which are generically referred to as receiving weight vectors 308, a first transmission weight vector 310a, a second transmission weight vector 310b, . . . and an Nth transmission weight vector 310n, which are generically referred to as transmission weight vectors 310, a reference signal 312 and a receiving response vector 402.

The reference signal generator 72 stores the preamble signals as shown in FIG. 2. During a training period, the reference signal generator 72 outputs the stored preamble signal as a reference signal 312. After the training period, the composite signal 304 is decided and the thus decided signal is outputted as a reference signal 312. It is assumed herein that the termination of a training period is notified by the signal processor control signal 330 from the control unit 20 (not shown in FIG. 6).

The receiving weight vector computing unit 70 computes receiving weight vectors 308 necessary for weighting the digital received signals 300, using an adaptive algorithm such as RLS (Recursive Least Squares) algorithm and LMS (Least Mean Squares) algorithm. The computation using the adaptive algorithm is done based on the digital received signal 300, the composite signal 304 and the reference signal 312. For example, the LMS algorithm is expressed by the following equation (1).

$$w(n+1) = w(n) + \mu u(n) e^*(n) \quad (1)$$

where w is a receiving weight vector 308, μ is a forgetting factor, u is a digital received signal 300 and e is an error indicative of intersymbol interference, namely, the error between a composite signal 304 and a reference signal 312.

The multipliers 78 weight the digital received signals 300 with the receiving weight vectors 308. The adder 80 adds up the outputs from the multipliers 78 so as to output the composite signal 304.

The receiving response vector computing unit 200 computes the receiving response vectors 402 as the receiving response characteristic of received signals in relation to transmitted signals. For the simplicity of explanation, assume herein that the number of terminal apparatus 26 is two. Of the two terminal apparatus 26, the first terminal apparatus 26 corresponds to a targeted terminal apparatus whereas the second terminal apparatus 26 is not the targeted terminal apparatus but corresponds to an interference source. Thus, it is assumed herein that a signal for the second terminal apparatus is inputted from a different signal processing unit 14 (not shown). If the second terminal apparatus as the interference source is not considered here, then the terms and paragraphs concerning the second terminal apparatus 26 may be removed as appropriate. For the simplicity of explanation, assume herein that the number of antennas 22 is four. An input signal vector X(T) corresponding to the digital received signal 300 is expressed by the following equation (2).

$$X(t) = H_1 Srx_1(t) + H_2 Srx_2(t) + N(t) \quad (2)$$

where $Srx_i(t)$ represents a signal transmitted from the ith terminal apparatus 26. And X(t) is the input signal vector as mentioned above and is also expressed by the following equation (3) if each of digital received signals 300 is expressed by $RX_j(t)$ where j is the antenna number in the antennas 22 and the superscript T denotes the transpose of a matrix.

$$X(t) = [RX_1(t), RX_2(t), \Lambda, RX_4(t)]^T \quad (3)$$

$H_i$ in the equation (2) is a receiving response vector 402 and is expressed by the following equation (4) if the response coefficient of a signal, from the ith terminal apparatus 26, received by the jth antenna 22 is denoted by $h_{ij}$.

$$H_i = [h_{1i}, h_{2i}, \Lambda, h_{4i}]^T (i=1,2) \quad (4)$$

N(t) in the equation (1) is a noise vector and is expressed by the following equation (5) if the noise contained in a signal received by the jth antenna 22, namely, the jth digital received signal 300 is denoted by $n_j(t)$ $$N(t) = [n_1(t), n_2(t), \Lambda, n_4(t)]^T \quad (5)$$

Here, if the adaptive array operation in the signal processing unit 14 works normally, the signals from a plurality of terminal apparatus 26 can be separated, so that the above-described $Srx_i(t)$ are all known signals. Regardless of this condition, the above-described $Srx_i(t)$ are all known signals in a training signal period, too. Utilizing this fact, the receiving response vector 402 can be derived as follows.

If an ensemble average is calculated based on a signal $Srx_1(t)$ from the first terminal apparatus 26, then the following equation (6) is derived.

$$E[X(t) \cdot Srx_1^*(t)] = \quad (6)$$
$$H_1 E[Srx_1(t) \cdot Srx_1^*(t)] + H_2 E[Srx_2(t) \cdot Srx_1^*(t)] + E[N(t) \cdot Srx_1^*(t)]$$

Though E in the equation (6) denotes the ensemble average, it is assumed herein that the processing for ensemble average is replaced by the processing for time average. If the processing for time average is executed for the sufficient period of time, the following equations (7) result.

$$E[Srx_1(t) \cdot Srx_1^*(t)] = 1$$

$$E[Srx_2(t) \cdot Srx_1^*(t)] = 0$$

$$E[N(t) \cdot Srx_1^*(t)] = 0 \tag{7}$$

The equations (7) hold because there is no correlation between $Srx_1(t)$ and $Srx_2(t)$ and also there is no correlation between $Srx_1(t)$ and $N(t)$. $H_1$ that corresponds to the receiving response vector 402 as above is expressed by the following equation (8).

$$H_1 = E[X(t) \cdot Srx_1^*(t)] \tag{8}$$

The transmission weight vector computing unit 76 estimates the transmission weight vectors 310 necessary for weighting the pre-separation signal 306, from the receiving weight vector 308 or the receiving response vector 402 that reflects receiving response characteristics. The method for estimating the transmission weight vectors 310 may be arbitrary. As a most simple method therefor, however, the receiving weight vector 308 may be used as it is. As another method, the receiving weight vector signal 308 or the receiving response vector 402 may be corrected using a conventional technique in view of the Doppler frequency shift of a propagation environment caused by time difference in between a receiving processing and a transmission processing. Here, for the simplicity of explanation, the receiving response vector 402 is to be used for the estimation of transmission weight vectors 310. However, the receiving weight vector 308 inputted through a signal line which is not shown in FIG. 6 may be used instead.

The receiving response vectors 402 corresponding respectively to a plurality of terminal apparatus 26 have already been derived in the receiving response vector computing unit 200. The estimation for the receiving response vectors 402 is done to evaluate predicted values of receiving response vectors 402 as indicated by the following equation (9).

$$V^{(q)}(i) = [h_1^{(q)}(i), h_2^{(q)}(i), h_3^{(q)}(i), h_4^{(q)}(i)] \tag{9}$$

Here, it is assumed in the same way as in the description of the receiving response vector computing unit 200 that the number of antennas 22 is four. The superscript "q" in the equation (9) indicates the qth terminal apparatus 26, and those other than the first terminal apparatus 26 correspond to terminal apparatus 26 which are the interference sources for the first terminal apparatus 26. The index "i" denotes time. The transmission weight vector 310 for the first terminal apparatus 26 is expressed by the following equation (10).

$$W^{(1)}(i)^T V^{(q)}(i) = 0 \tag{10}$$

In the equation (10), suppose that q is two or more. And the following conditions c1) and c2) are imposed as constraints.

c1) $W^{(1)}(i) V^{(1)}(i) = g$(constant)

c2) $\|W^{(1)}(i)\|$ is minimized \hfill (11)

The method for estimating the transmission weight vectors 310 is not limited thereto, and a method using pseudo-correlation value or a method in which the beam is aimed toward a predetermined terminal apparatus 26 may be carried out. In particular, the method using the pseudo-correlation value is described in the literatures, such as, T. Ohgane, Y. Ogawa and K. Itoh, "A study on a channel allocation scheme with an adaptive array", Proc. VTC'97, vol. 2, pp. 725-729, May 1997.

The multipliers 82 weight the pre-separation signal 306 with the transmission weight vectors 310 so as to output the digital transmission signals 302.

In terms of hardware, the above-described structure can be realized by a CPU, a memory and other LSIs of an arbitrary computer. In terms of software, it can be realized by memory-loaded programs which have managing and scheduling functions or the like, but drawn and described herein are function blocks that are realized in cooperation with those. Thus, it is understood by those skilled in the art that these function blocks can be realized in a variety of forms such as by hardware only, software only or the combination thereof.

Figure 7:
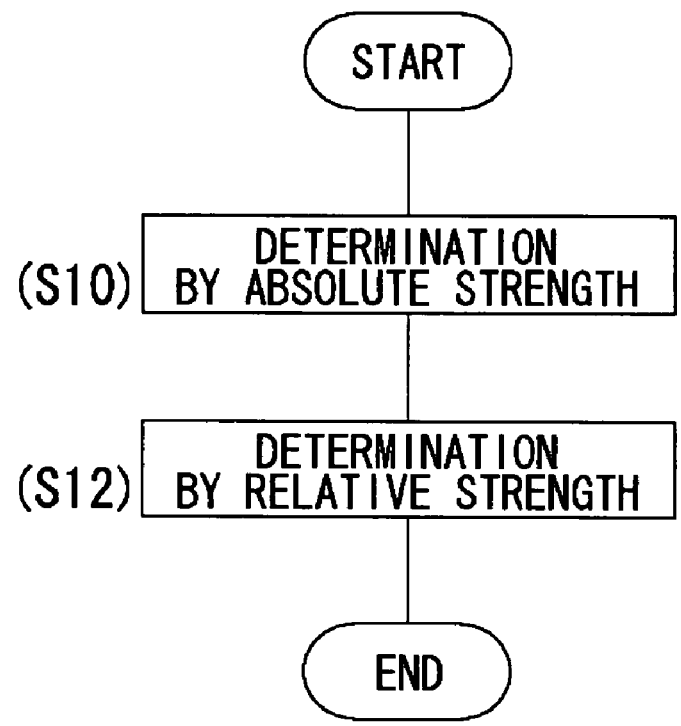
FIG. 7 is a flowchart showing a procedure of malfunction detection processing by the detection unit shown in FIG. 5.

FIG. 7 is a flowchart showing a procedure of malfunction detection processing. The detection unit 212 evaluates and carries out the determination by the absolute strength of received RSSI values for a plurality of measured control signals (S10). Then the determination by the relative strength is done (S12). That is, the malfunction detection is performed in two stages. The details of the determination by the absolute strength and the determination by the relative strength will be described later.

Figure 8:
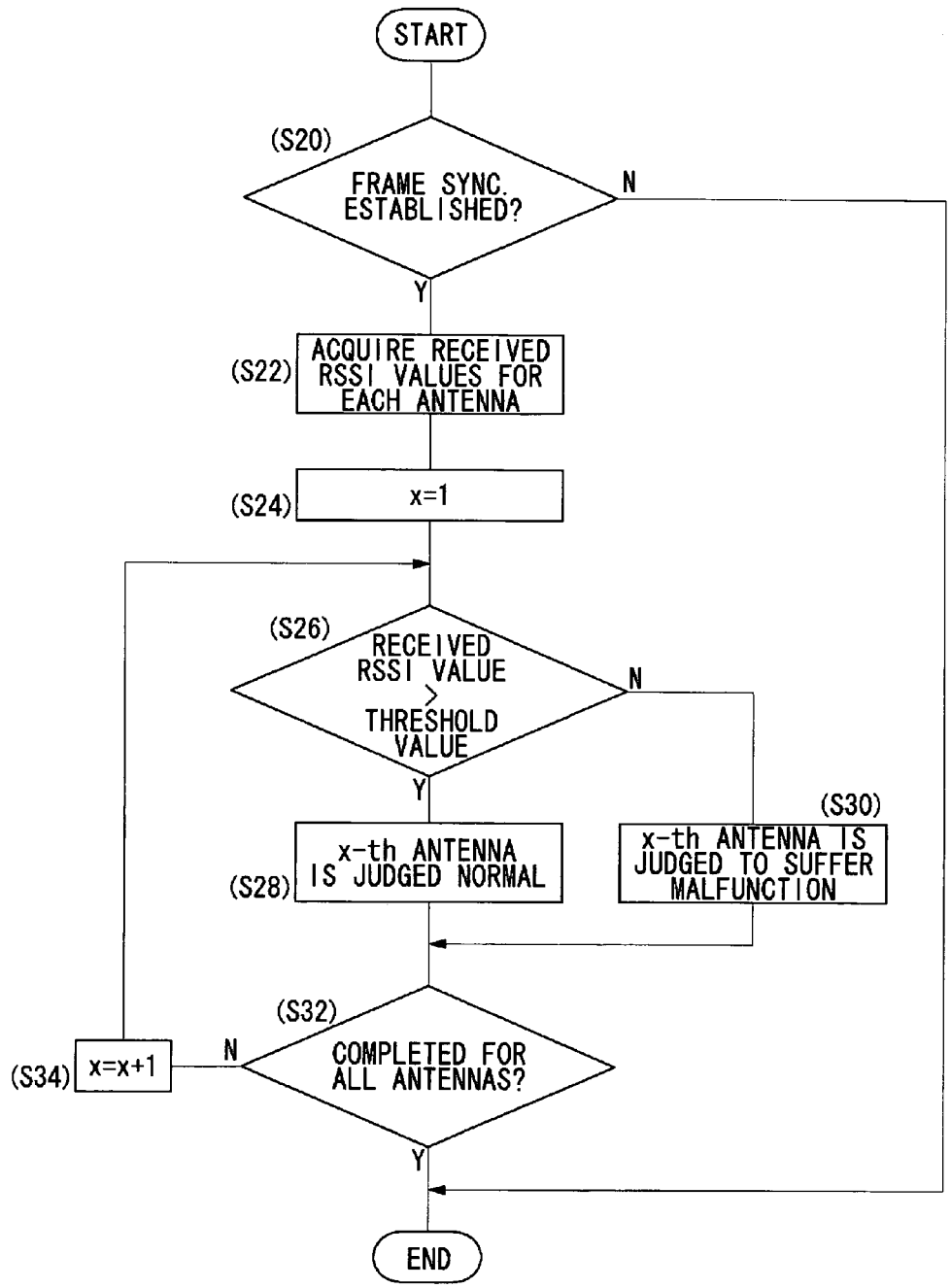
FIG. 8 is a flowchart showing a procedure of determination processing by absolute strength shown in FIG. 7.

FIG. 8 is a flowchart showing a procedure of determination processing by the absolute strength. The flowchart shown in FIG. 8 corresponds to the determination by absolute strength shown in FIG. 7. If the frame synchronization has been established by the control unit 20 (Y of S20), the measuring unit 214 acquires, for each of the antennas 22, the received RSSI values from the detection received signal 340 (S22). Here, the identification number of antenna 22 is denoted by "x" and the initial value is set to "x=1" (S24). The maximum value of "x" is the number of antennas 22. If a received RSSI value is larger than a threshold value (Y of S26), the first comparator 216 judges that the xth antenna 22 is normal (S28).

If the received RSSI value for the xth antenna 22 is not greater than the threshold value (N of S26), the first comparator 216 judges that the xth antenna 22 suffers a malfunction (S30). The result thereof is outputted to the decision unit 222. If the above processing has not been completed for all the antennas 22 (N of S32), x is incremented by 1 (S34) and a processing from Step 26 onward will be repeatedly executed. If, on the other hand, the above processing has been completed for all the antennas 22 (Y of S32) or if the frame synchronization has not been established by the control unit 20 (N of S20), the processing is terminated.

Figure 9:
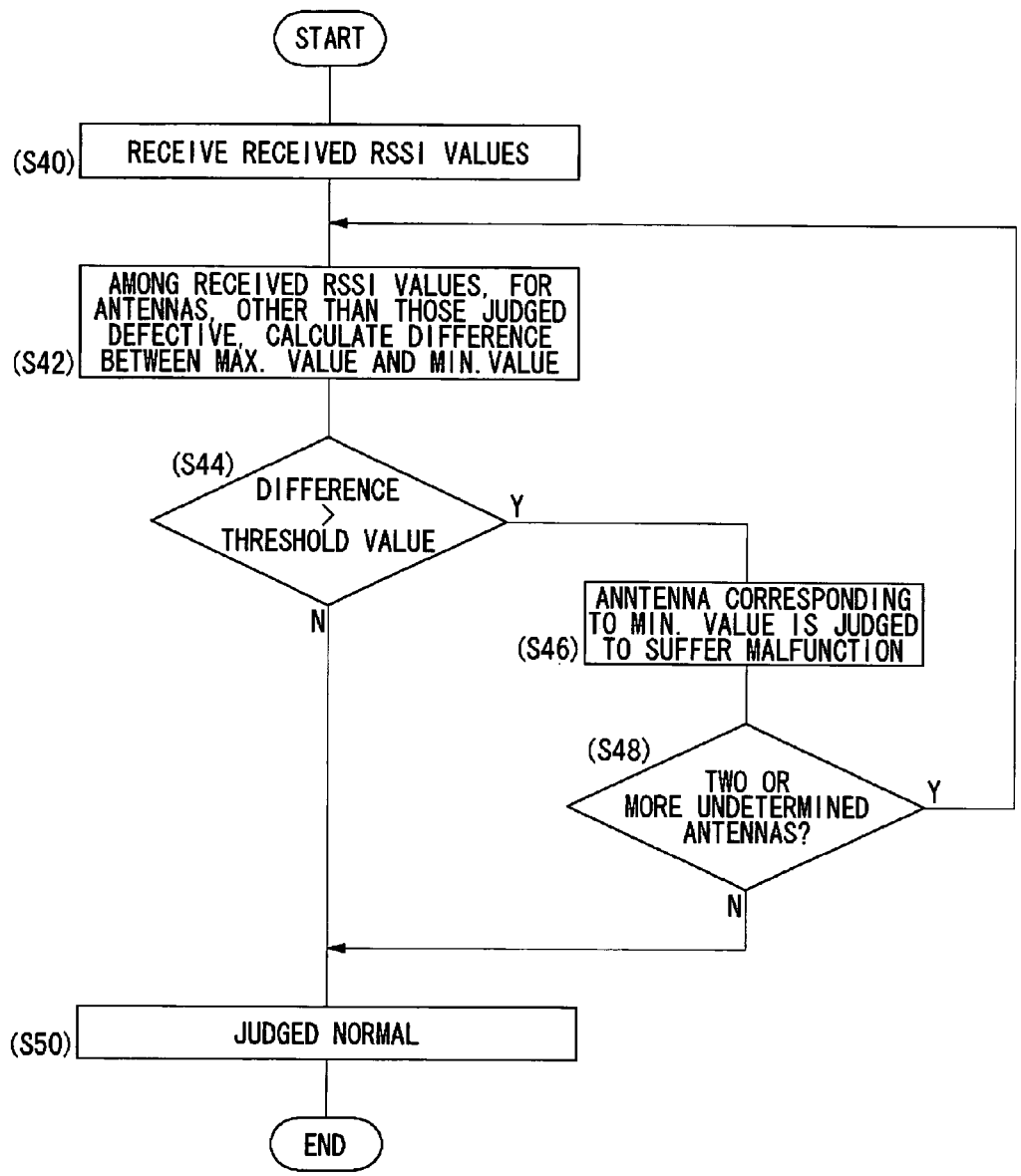
FIG. 9 is a flowchart showing a procedure of determination processing by relative strength shown in FIG. 7.

FIG. 9 is a flowchart showing a procedure of determination processing by the relative strength. The flowchart shown in FIG. 9 corresponds to the determination by relative strength shown in FIG. 7. The strength difference deriving unit 218 receives the received RSSI values from the first comparator 216 (S40). It is to be noted that the received RSSI values received by the strength difference deriving unit 218 may be only those other than the RSSI values which have been determined to be faulty by the first comparator 216. Among the received RSSI values, for the antennas 22, other than those determined to be faulty, the strength difference deriving unit 218 selects the maximum value and the minimum value and calculates a difference between the maximum value and the minimum value (S42).

If the difference is larger than a threshold value (Y of S44), the second comparator 220 judges that an antenna 22 and part of communication functions corresponding to the minimum value suffer malfunctions (S46). The result thereof is outputted to the decision unit 222. If there are two or more received RSSI values corresponding to an antenna 22 which has not been determined as to whether it is normal or not (Y of S48), the strength difference deriving unit 218 and the second comparator 220 execute repeatedly a processing from Step 42 onward. If, on the other hand, the difference is not larger than the threshold value (N of S44) or if there is no two or more received RSSI values corresponding to the undetermined antenna 22 (N of S48), the second comparator 220 judges that the corresponding antenna 22 and part of communication functions are normal (S50).

Figure 10:
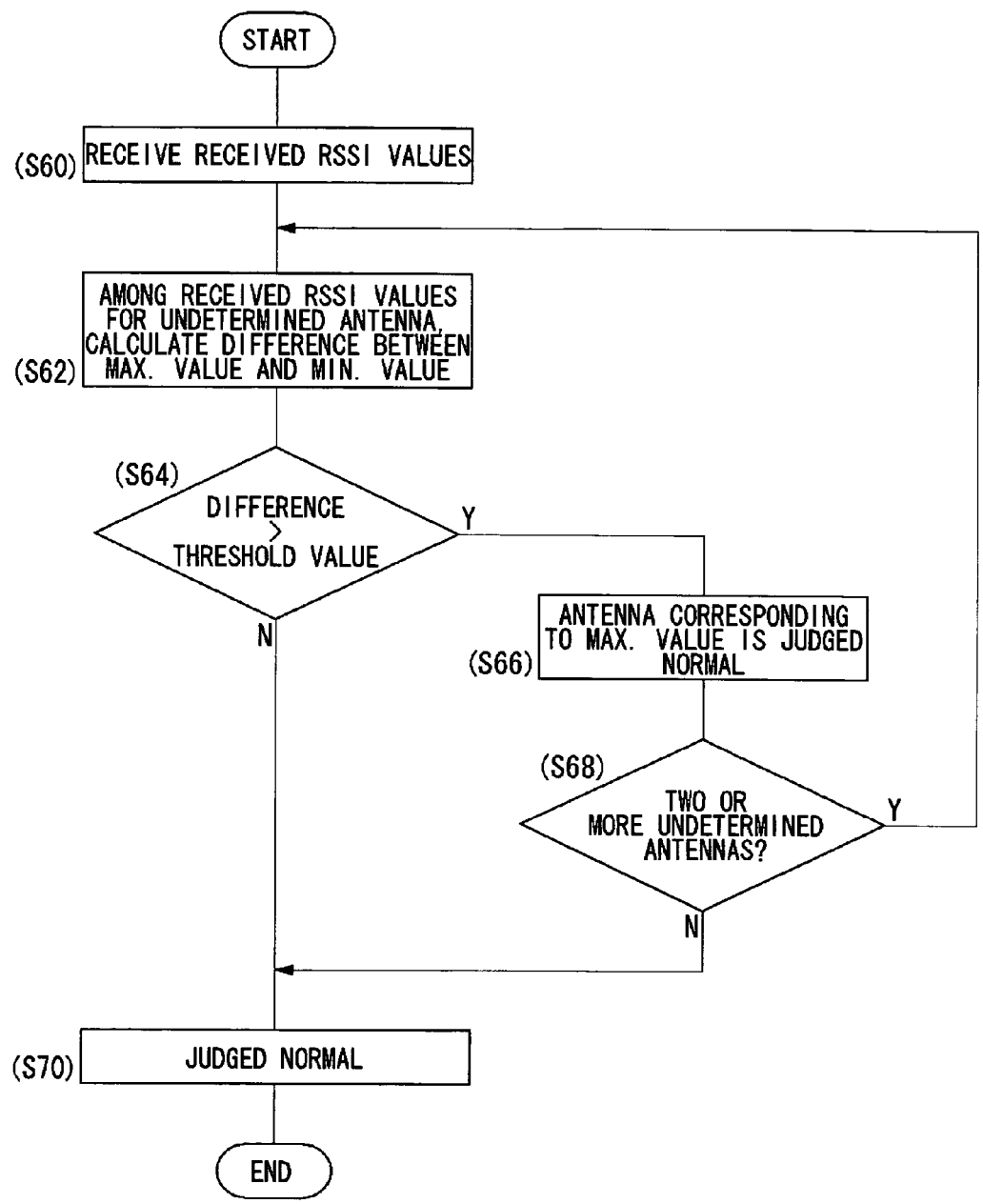
FIG. 10 is another flowchart showing a procedure of determination processing by the relative strength shown in FIG. 7.

FIG. 10 is a flowchart showing a procedure of determination processing by the relative strength. Similarly to FIG. 9, the flowchart shown in FIG. 10 corresponds to the determination by relative strength shown in FIG. 7. The determination processing shown in FIG. 10 differs in its determination scheme from that shown in FIG. 9. The strength difference deriving unit 218 receives received RSSI values from the first comparator 216 (S60). It is to be noted that the received RSSI values received by the strength difference deriving unit 218 may be only those other than the RSSI values which have been determined to be faulty by the first comparator 216. Among the received RSSI values, for the antennas 22, other than those determined to be faulty, the strength difference deriving unit 218 selects the maximum value and the minimum value and calculates a difference between the maximum value and the minimum value (S62).

If the difference is larger than a threshold value (Y of S64), the second comparator 220 judges that an antenna 22 and part of communication functions corresponding to the maximum value are normal (S66). The result thereof is outputted to the decision unit 222. If there are two or more received RSSI values corresponding to an antenna 22 which has not been determined as to whether it is normal or not (Y of S68), the strength difference deriving unit 218 and the second comparator 220 execute repeatedly a processing from Step 62 onward. If, on the other hand, the difference is not larger than the threshold value (N of S64) or if there is no two or more received RSSI values corresponding to the undetermined antenna 22 (N of S68), the second comparator 220 judges that the corresponding antenna 22 and part of communication functions are normal (S70). As a result thereof, it is judged that the undetermined antenna 22 and part of communication functions suffer malfunctions.

The detection method illustrated in FIG. 9 and that in FIG. 10 are identical at one point where the maximum value and the minimum value are selected in the received RSSI values and the difference between them is compared with the threshold value. The detection methods differ in that the malfunctioning antenna 22 is detected in FIG. 9 and the normal antenna 22 is detected in FIG. 10 when the difference is larger than the threshold value. That is, in FIG. 9 the detection is performed based on the maximum received RSSI value whereas in FIG. 10 the detection is performed based on the minimum received RSSI value.

Figure 11:
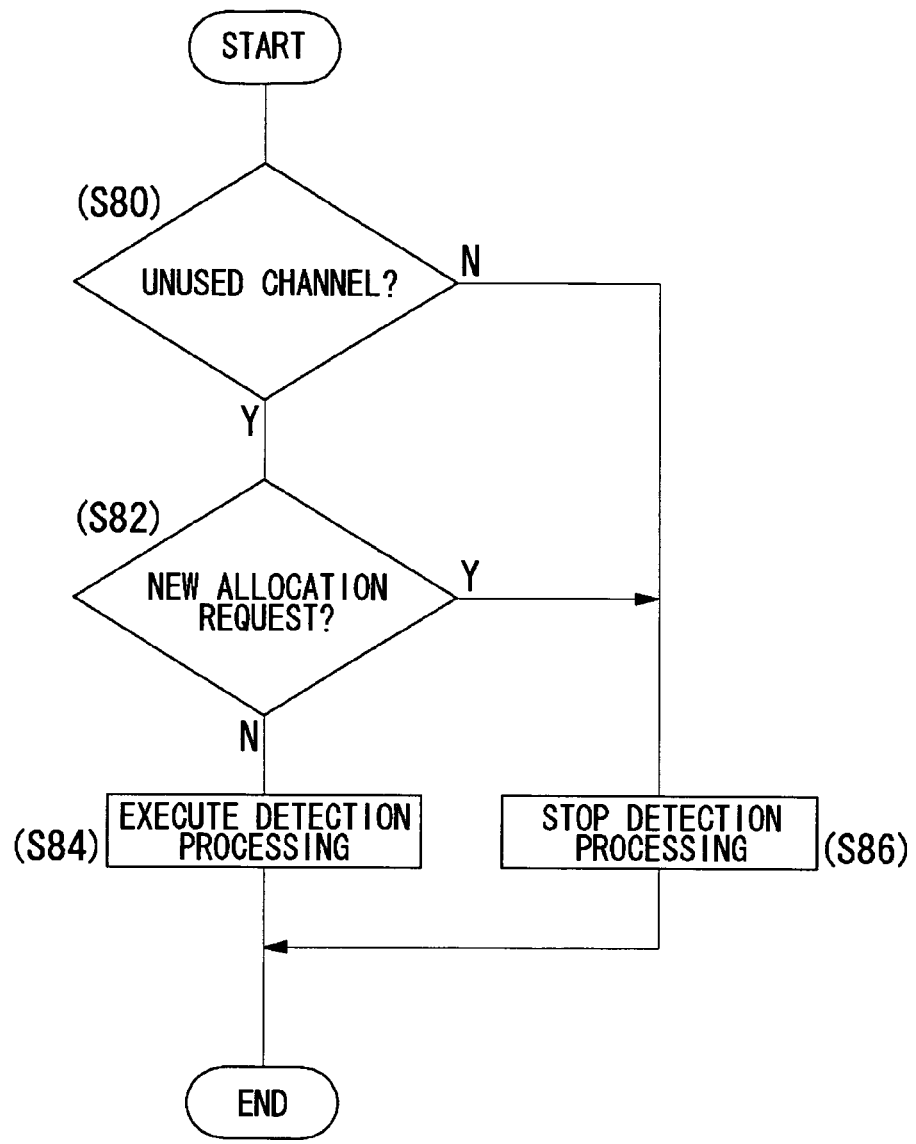
FIG. 11 is another flowchart showing a procedure of malfunction detection processing by the detection unit shown in FIG. 5.

FIG. 11 is a flowchart showing a procedure of malfunction detection processing by the detection unit 212. This corresponds to a case when a base station apparatus 10 receives a channel allocation request from a terminal apparatus 26. When there is an unused channel in the channel that control unit 20 has allocated (Y of S80), that is, when there is an unused time slot in a frame and there is no new channel allocation request coming from the terminal apparatus 26 (N of S82), the detection unit 212 carries out the aforementioned detection processing (S84). When there is no unused channel in the channel that the control unit 20 has allocated (N of S80) or when there is a new channel allocation request from the terminal apparatus (Y of S82), the detection unit 212 stops the aforementioned detection processing (S86).

In the present embodiment, a predetermined time slot is used to perform the malfunction detection processing. If other time slots are not used, the other time slots will be allotted for the channel allocation requests from the terminal apparatus 26, so that the malfunction detection processing continues. If, on the other hand, the other time slots are being used, the malfunction detection processing is interrupted upon receipt of the channel allocation request from the terminal apparatus 26 and then the time slots used for the malfunction detection processing are allotted to this terminal apparatus 26. In this manner, a higher priority is put on the communication with the terminal apparatus 26 than the malfunction detection processing, so that according to the first embodiment the new connection of the terminal apparatus 26 is not interrupted.

An operation of the detection unit 212 structured as above will be described hereunder. The measuring unit 214 measures a plurality of received RSSI values that correspond respectively to a plurality of antennas 22. Assume herein that the number of antennas 22 is four. The received RSSI value corresponding to the first antenna 22a is defined as a first received RSSI value. And the second received RSSI value to the fourth received RSSI value are defined in the similar manner. The first comparator 216 compares the first to fourth received RSSI values with a predetermined threshold value. Since the fourth received RSSI value is not larger than the threshold value here, it is judged that the fourth antenna 22d and the communication function corresponding thereto suffer malfunctions.

The strength difference deriving unit 218 selects the first received RSSI value bearing the maximum value and the third received RSSI value bearing the minimum value from among the first to third received RSSI values, and calculates the difference between the maximum value and the minimum value. Since the difference is larger than the threshold value, the second comparator 220 judges that the third antenna and the communication function corresponding thereto suffer malfunctions. Of the first received RSSI value and the second received RSSI value, the strength difference deriving unit 218 selects the first received RSSI value bearing the maximum value and the second received RSSI value bearing the minimum value and calculates the difference between the maximum value and the minimum value. Since the difference is smaller than or equal to the threshold value, the second comparator 220 judges that the first and second antennas 22a and 22b and the communication functions corresponding thereto are normal.

According to the present embodiment, the periodically transmitted control signals are used, so that the malfunction can be detected in a short period of time. Used are the control signals from the base station apparatus installed at high altitudes. Thus, stable signals are used and even if a statistical processing is carried out, the period therefor can be shortened. The control signals from the base station apparatus installed at high altitudes are used, so that steady signals can be used and the malfunction can be detected with high accuracy. Furthermore, no additional circuit is required, so that the cost increase can be suppressed. Since no additional circuit is necessary, the increase in size can be suppressed. Since no additional circuit is necessary, the increase in power consumption can be suppressed. Since no additional circuit is required, the performance of the base station apparatus itself will not be lowered. The malfunction of a receiver circuit can also be detected. Since a higher priority is put on the processing of a terminal apparatus that requires a new connection than the detection processing, so that the terminal apparatus requesting a new connection is not affected. Furthermore, since the determination by relative strength is executed in addition to the determination by absolute strength, the effect of the distance between the base station apparatuses is taken into account, thereby improving the detection accuracy.

SECOND EMBODIMENT

Similar to the first embodiment, a second embodiment according to the present invention relates to a malfunction detection processing in a base station apparatus of a personal handyphone system (PHS). Similar to the first embodiment, a base station apparatus according to the second embodiment receives control signals transmitted from other base station apparatus and detects a malfunction, if any, of apparatus based on the control signals received. However, the determination processing in detecting the malfunctions differs from the first embodiment. The base station apparatus measures the strength of the received control signal, and if the thus measured strength thereof is smaller than a predetermined threshold value, then it determines that a malfunction of apparatus has been detected. In order to improve the accuracy of detecting malfunctions, the base station apparatus according to the present embodiment compares relatively the strengths of the control signals received respectively by a plurality of antennas so as to detect malfunction of apparatus.

That is, the maximum value and the minimum value are selected from among the strengths of a plurality control signals, and the strength of the plurality of control signals are compared with the maximum value and the minimum value so as to detect a malfunction, if any. That is, if the strength is close to the maximum value and is far from the minimum value, it is judged normal. And if otherwise, it is judged defective. Since fixed references are provided to carry out determination, the processing accuracy is raised. Two values for which the difference therebetween is the maximum are selected, as the references, from among the strengths of a plurality of control signals, so that the margin for noise or the like is broader and thereby the processing accuracy is raised.

A base station apparatus 10, a first radio unit 12a and a signal processing unit 14 according to the second embodiment are of the same type as the base station apparatus 10 of FIG. 2, the first radio unit 12a of FIG. 4 and the signal processing unit 14 of FIG. 6, respectively. Thus the repeated description thereof is omitted here.

Figure 12:
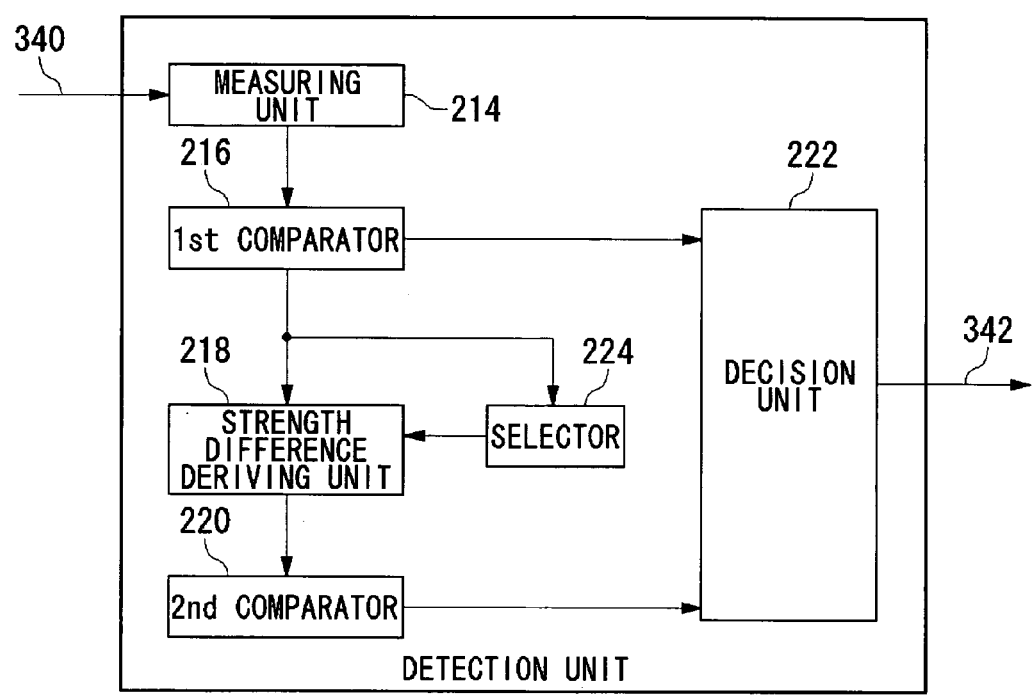
FIG. 12 illustrates a structure of a detection unit according to a second embodiment of the present invention.

FIG. 12 illustrates a structure of a detection unit 212 according to the second embodiment of the present invention. This detection unit 212 is structured such that a selector 224 is added to the detection unit of FIG. 5.

Among a plurality of received RSSI values measured by a measuring unit 214, the selector 224 selects the maximum value and the minimum vale of the received RSSI values inputted from the first comparator 216. The selected maximum and minimum values are outputted to the strength difference deriving unit 218 as reference values.

For the received RSSI values inputted from the first comparator 216 among the plurality of received RSSI values measured by the measuring unit 214, the strength difference deriving unit 218 calculates the differences between them and the aforementioned maximum value as well as the aforementioned minimum value, respectively. That is, two differences, namely, a first difference between a received RSSI value to be determined and the maximum value and a second difference between a received RSSI value to be determined and the minimum value are calculated, respectively. The strength difference deriving unit 218 compares each of the thus calculated first and second differences to predetermined threshold values. If the first difference is smaller than a first threshold value and the second difference is larger than a second threshold value, it is determined that the communication function containing an antenna 22, which corresponds to said received RSSI value, is normal. On the other hand, if this condition does not hold, it is determined that the communication function containing an antenna 22, which corresponds to said received RSSI value, is faulty. When the malfunction is detected, it is notified to the decision unit 222 accordingly. For the received RSSI values which still have not been determined as to whether they are normal or not, the strength difference deriving unit 218 and the second comparator 220 repeats the above processing.

According to the second embodiment, the maximum value and the minimum value which are most distant from each other are selected as the reference values, so that the margin for noise or the like is broader. Furthermore, the decision is made in a manner such that the maximum value and the minimum values are fixed as the reference values. Thus, the occurrence of false detection can be minimized and therefore the detection accuracy can be improved.

Figure 13:
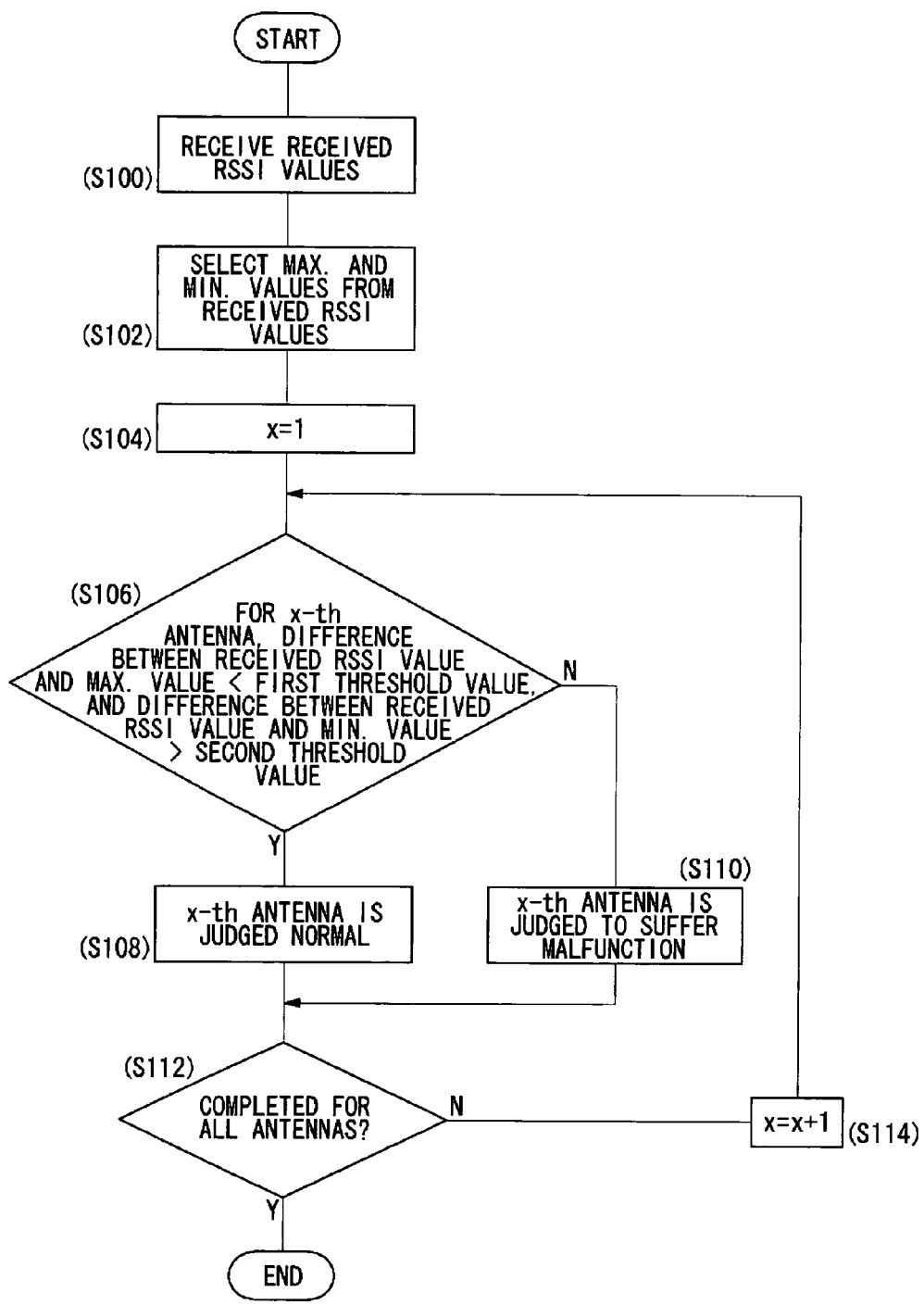
FIG. 13 is a flowchart showing a procedure of malfunction detection processing by a detection unit shown in FIG. 12.

FIG. 13 is a flowchart showing a procedure of malfunction detection processing by the detection unit 212. The flowchart shown in FIG. 13 corresponds to the determination by relative strength shown in FIG. 7. The strength difference deriving unit 218 and the selector 224 receive the received RSSI values from the first comparator 216 (S100). It is to be noted that the received RSSI values received by the strength difference deriving unit 218 and the selector 224 may be only those other than the RSSI values which have been determined to be faulty by the first comparator 216. Among the received RSSI values, for the antennas 22, other than those determined to be faulty, the selector 224 selects the maximum value and the minimum value (S102) and outputs these to the strength difference deriving unit 218 as the reference values. Here, the identification number of antenna 22 is denoted by "x" and the initial value is set to "x=1" (S104).

If the difference between the maximum value and a received RSSI value corresponding to the xth antenna 22 is smaller than the first threshold value and the difference between the minimum value and the received RSSI value is larger than the second threshold value (Y of S106), the strength difference deriving unit 218 and the second comparator 220 judge that the xth antenna 22 and part of the communication function are normal (S108). If, on the other hand, the difference between the maximum value and the received RSSI value corresponding to the xth antenna 22 is not smaller than the first threshold value or the difference between the minimum value and the received RSSI value is not larger than the second threshold value (N of S106), the strength difference deriving unit 218 and the second comparator 220 judge that the xth antenna 22 and part of the communication function suffer malfunctions (S110). If the above processing has not been completed for all the antennas 22 (N of S112), x is incremented by 1 (S114) and a processing from Step 106 onward will be repeatedly executed. If, on the other hand, the above processing has been completed for all the antennas 22 (Y of S112), the processing is terminated.

An operation of the detection unit 212 structured as above will be described hereunder. The measuring unit 214 measures a plurality of received RSSI values that correspond respectively to a plurality of antennas 22. Assume herein that the number of antennas 22 is four. The received RSSI value corresponding to the first antenna 22a is defined as a first received RSSI value. And the second received RSSI value to the fourth received RSSI value are defined in the similar manner. The first comparator 216 compares the first to fourth received RSSI values with a predetermined threshold value. Since the fourth received RSSI value is not larger than the threshold value here, it is judged that the fourth antenna 22d and the communication function corresponding thereto suffer malfunctions.

The selector 224 selects the first received RSSI value bearing the maximum value and the third received RSSI value bearing the minimum value from among the first to third received RSSI values, and outputs the selected values to the strength difference deriving unit 218. Now, the first received RSSI value is selected as a signal value to be determined. Since the difference between the maximum value and the first received RSSI value is smaller than the first threshold value and the difference between the minimum value and the first received RSSI value is larger than the second threshold value, the strength difference deriving unit 218 and the second comparator 220 judge that the first antenna 22a and the communication function corresponding thereto are normal. Then the second received RSSI value is selected as a signal value to be determined. Since the difference between the maximum value and the second received RSSI value is smaller than the first threshold value and the difference between the minimum value and the second received RSSI value is larger than the second threshold value, the strength difference deriving unit 218 and the second comparator 220 judge that the second antenna 22b and the communication function corresponding thereto are normal. Then the third received RSSI value is selected as a signal value to be determined. Since the difference between the maximum value and the third received RSSI value is larger than the first threshold value and the difference between the minimum value and the third received RSSI value is smaller than the second threshold value, the strength difference deriving unit 218 and the second comparator 220 judge that the third antenna 22c and the communication function corresponding thereto suffer malfunctions.

According to the second embodiment, the selection is made based on the maximum value and the minimum value and a malfunction is detected based on the thus selected references, thus improving the detection accuracy. Furthermore, the fixed criteria such as fixed values are set throughout the detection processing, so that the detection accuracy can be improved. Since the maximum value and the minimum value are selected as the references, the noise margin can be broadened.

The present invention has been described based on the embodiments which are only exemplary. It is therefore understood by those skilled in the art that other various modifications to the combination of each component and process described above are possible and that such modifications are also within the scope of the present invention.

In the above first and second embodiments, the communication system 100 is represented by the personal handyphone system (PHS) but is not limited thereto, and for example, cellular telephone systems, third-generation mobile-phone systems or FWA (Fixed Wireless Access) systems may also serve the purpose. According to this modification, the present invention can be applied to various types of communication systems 100. That is, it suffices if a base station apparatus 10 allocates a predetermined channel to a control signal.

In the above first and second embodiments, the measuring unit 214 measures the strength of control signals as the quality of control signals. However, the quality thereof to be measured is not limited thereto and, for example, EVM (Error Vector Magnitude) may be measured as the quality of control signals. According to this modification, the quality of control signals can be measured in greater details. That is, it suffices as long as the quality with which the communication is affected can be acquired.

In the above first and second embodiments, the detector 212 performs the determination by absolute strength and the determination by relative strength in a consecutive manner. However, how the determination is performed is not limited thereto and, for example, only one of the determination by absolute strength and the determination by relative strength may be performed. In the former case, the detector 212 compares the measured strength of a control signal to a predetermined threshold value, and if the strength is less than or equal to a threshold value, a malfunction of the communication functions in the base station apparatus 10 is detected. In the latter case, the malfunction of the communication functions in the base station apparatus 10 is detected based on the relative relationship in the strength among a plurality of control signals. According to this modification, the processing can be simplified. That is, it suffices as long as the malfunction of communication functions can be detected.

In the above first and second embodiments, the base station apparatus 10 executes adaptive array processing by the signal processing unit 14. However, the processing is not limited thereto and, for example, the base station apparatus 10 may be equipped with a plurality of antennas 22 and execute diversity processing thereby. According to this modification, the present invention may be applied to various base station apparatuses 10. That is, it suffices if a plurality of antennas 22 are provided.

The combination of the first embodiment and the second embodiment is also effective. According to this combination, the advantageous effects deriving from both the first embodiment and the second embodiment are achieved.

Although the present invention has been described by way of exemplary embodiments and modifications, it should be understood that many other changes and substitutions may further be made by those skilled in the art without departing from the scope of the present invention which is defined by the appended claims.

What is claimed is:

1. A base station apparatus, comprising:
a control unit which allocates a predetermined channel to a terminal apparatus to be communicated and allocates another channel, which differs from said channel allocated to the terminal apparatus, to a control signal;
a communication unit which communicates with the terminal apparatus to which the predetermined channel is allocated to and which transmits periodically said control signal to which a channel other than said channel is allocated;
a measuring unit which receives periodically, via said communication unit, a control signal from another base station apparatus through the channel other than the channels allocated to the terminal apparatus and the control signal, and which measures the quality of the thus received control signal; and
a detection unit which detects a malfunction, if any, of the communication unit based only on the quality of the control signal measured by said measuring unit.

2. A base station apparatus according to claim 1, wherein said measuring unit measures the strength of a received control signal as the quality of the thus received control signal, and
wherein if the strength of a measured control signal is less than or equal to a predetermined threshold value, said detection unit determines that a malfunction of the communication unit has been detected.

3. A base station apparatus according to claim 1, wherein said communication unit includes a plurality of antennas,
wherein said measuring unit measures, as the quality of the thus received control signal, the strengths of control signals received respectively by the plurality of antennas, and wherein said detection unit detects a malfunction of the communication unit, based on a relative relationship among the strengths of control signals received respectively by the plurality of antennas.

4. A base station apparatus according to claim 1, wherein said communication unit includes a plurality of antennas, wherein said measuring unit measures, as the quality of the thus received control signal, the strengths of control signals received respectively by the plurality of antennas, and wherein if the strengths of control signals received respectively by the plurality of antennas are greater than a predetermined threshold value, said detection unit detects a malfunction of the communication unit, based on a relative relationship among the strengths of control signals received respectively by the plurality of antennas.

5. A base station apparatus according to claim 3, wherein said detection unit calculates a difference in strength between control signals received respectively by two of the plurality of antennas, and if the calculated difference is greater than a predetermined threshold, it is determined that part of the communication unit containing an antenna corresponding to the smaller strength in the control signals received respectively by two of the plurality of antennas suffers a malfunction.

6. A base station apparatus according to claim 4, wherein said detection unit calculates a difference in strength between control signals received respectively by two of the plurality of antennas, and if the calculated difference is greater than a predetermined threshold, it is determined that part of the communication unit containing an antenna corresponding to the smaller strength in the control signals received respectively by two of the plurality of antennas suffers a malfunction.

7. A base station apparatus according to claim 3, wherein said detection unit calculates a difference in strength between control signals received respectively by two of the plurality of antennas, and if the calculated difference is greater than a predetermined threshold, it is determined that part of the communication unit containing an antenna corresponding to the larger strength in the control signals received respectively by two of the plurality of antennas is normal.

8. A base station apparatus according to claim 4, wherein said detection unit calculates a difference in strength between control signals received respectively by two of the plurality of antennas, and if the calculated difference is greater than a predetermined threshold, it is determined that part of the communication unit containing an antenna corresponding to the larger strength in the control signals received respectively by two of the plurality of antennas is normal.

9. A base station apparatus according to claim 3, wherein said detection selects maximum strength and minimum strength from among the strengths of control signals received respectively by the plurality of antennas, and if the strengths of control signals received respectively by the plurality of antennas lie within a first range from the selected maximum strength and lie outside a second range from the selected minimum strength, it is determined that part of the communication unit containing an antenna corresponding to said strength of control signals is normal.

10. A base station apparatus according to claim 4, wherein said detection selects maximum strength and minimum strength from among the strengths of control signals received respectively by the plurality of antennas, and if the strengths of control signals received respectively by the plurality of antennas lie within a first range from the selected maximum strength and lie outside a second range from the selected minimum strength, it is determined that part of the communication unit containing an antenna corresponding to said strength of control signals is normal.

11. A base station apparatus according to claim 1, wherein when said communication unit receives a channel allocation request from a new terminal apparatus while a detection processing is being executed, said detection unit stops the detection processing.

12. A base station apparatus according to claim 2, wherein when said communication unit receives a channel allocation request from a new terminal apparatus while a detection processing is being executed, said detection unit stops the detection processing.

13. A base station apparatus according to claim 3, wherein when said communication unit receives a channel allocation request from a new terminal apparatus while a detection processing is being executed, said detection unit stops the detection processing.

14. A base station apparatus according to claim 4, wherein when said communication unit receives a channel allocation request from a new terminal apparatus while a detection processing is being executed, said detection unit stops the detection processing.

15. A malfunction detecting method characterized in that a control signal is received periodically from another base station apparatus by a predetermined channel allocated to a terminal apparatus to be communicated and another channel, which differs from the channel allocated to the terminal apparatus, the another channel differing from the channel allocated to the control signal, the quality of the received control signal is measured, and a malfunction of functions to communicate with the terminal apparatus is detected based on the measured quality of control signal.

* * * * *